US007275685B2

(12) United States Patent
Gray et al.

(10) Patent No.: US 7,275,685 B2
(45) Date of Patent: Oct. 2, 2007

(54) METHOD FOR ELECTRONIC PAYMENT

(75) Inventors: R. O'Neal Gray, Dallas, TX (US);
Shawn V. Fitzgerald, Van Alstyne, TX (US); Joseph R. Piket, Maple Grove, MN (US)

(73) Assignee: Rearden Capital Corporation, Dallas, TX (US)

( * ) Notice: Subject to any disclaimer, the term of this patent is extended or adjusted under 35 U.S.C. 154(b) by 29 days.

(21) Appl. No.: 11/185,112

(22) Filed: Jul. 20, 2005

(65) Prior Publication Data

US 2006/0006226 A1 Jan. 12, 2006

Related U.S. Application Data

(63) Continuation-in-part of application No. 11/061,616, filed on Feb. 22, 2005, which is a continuation-in-part of application No. 10/964,654, filed on Oct. 15, 2004, which is a continuation-in-part of application No. 10/821,988, filed on Apr. 12, 2004.

(30) Foreign Application Priority Data

Dec. 28, 2004 (EP) .................... 04030898

(51) Int. Cl.
 *G06K 5/00* (2006.01)
(52) U.S. Cl. .................... 235/380; 705/26; 705/39
(58) Field of Classification Search ............... 235/380; 455/557; 705/26, 44, 39, 40
See application file for complete search history.

(56) References Cited

U.S. PATENT DOCUMENTS

| 5,140,517 A | 8/1992 | Nagata et al. |
| 5,317,636 A | 5/1994 | Vizcanio |
| 5,710,887 A | 1/1998 | Chelliah et al. |
| 5,711,012 A | 1/1998 | Bottoms et al. |
| 5,726,893 A | 3/1998 | Schuchman et al. |
| 5,890,137 A | 3/1999 | Koreeda |
| 5,913,202 A | 6/1999 | Motoyama |

(Continued)

FOREIGN PATENT DOCUMENTS

EP 1 331 582 A 7/2003

OTHER PUBLICATIONS

Mastercard International; Frequently Asked Questions About MasterCard SecureCode; 1994-2004, pp. 1-2.

(Continued)

*Primary Examiner*—Daniel Hess
(74) *Attorney, Agent, or Firm*—Jones, Walker, Waechter, Poitevent, Carrere & Denegre, L.L.P.

(57) ABSTRACT

The invention is a system for facilitating credit card transactions. The system operates in a setting that includes a merchant platform, a System platform and a subscriber mobile device. The merchant platform is in electronic data communications with the System platform and the subscriber mobile device is in electronic data communication with the System platform. The merchant platform receives transaction information though voice communications from a subscriber and a portion of the transaction information is sent electronically to the System platform. The System platform electronically communicates a subset of the portion to the mobile communications device, and the mobile communications device sending data related to account information to the System platform. The System platform electronically transmitting this account information to a Processor for payment authorization.

14 Claims, 10 Drawing Sheets

U.S. PATENT DOCUMENTS

| | | |
|---|---|---|
| 5,960,411 A | 9/1999 | Hartman et al. |
| 5,991,749 A | 11/1999 | Morrill, Jr. |
| 6,070,154 A | 5/2000 | Tavor et al. |
| 6,088,683 A | 7/2000 | Jalili |
| 6,104,726 A | 8/2000 | Yip et al. |
| 6,226,529 B1 | 5/2001 | Bruno et al. |
| 6,324,526 B1 | 11/2001 | D'Agostino |
| 6,378,075 B1 | 4/2002 | Goldstein et al. |
| 6,446,048 B1 | 9/2002 | Wells et al. |
| 6,493,338 B1 | 12/2002 | Preston et al. |
| 6,598,031 B1 | 7/2003 | Ice |
| 6,609,113 B1 | 8/2003 | O'Leary et al. |
| 6,611,818 B1 | 8/2003 | Mersky et al. |
| 6,615,183 B1 | 9/2003 | Kolls |
| 6,636,833 B1 | 10/2003 | Flitcroft et al. |
| 6,662,020 B1 | 12/2003 | Aaro et al. |
| 6,690,681 B1 | 2/2004 | Preston et al. |
| 6,749,114 B2 | 6/2004 | Madani |
| 6,798,762 B1 | 9/2004 | Olson |
| 6,839,692 B2 | 1/2005 | Carrott et al. |
| 2001/0039535 A1 | 11/2001 | Tsiounis et al. |
| 2002/0001317 A1 | 1/2002 | Herring |
| 2002/0026519 A1 | 2/2002 | Itabashi et al. |
| 2002/0049639 A1 | 4/2002 | Tanaka et al. |
| 2002/0083008 A1 | 6/2002 | Smith et al. |
| 2002/0128929 A1 | 9/2002 | Urabe |
| 2002/0145043 A1 | 10/2002 | Challa et al. |
| 2003/0014371 A1 | 1/2003 | Turgeon |
| 2003/0028481 A1 | 2/2003 | Flitcroft et al. |
| 2003/0066879 A1 | 4/2003 | Cummins |
| 2003/0075610 A1 | 4/2003 | Ong |
| 2003/0126076 A1 | 7/2003 | Kwok et al. |
| 2003/0191945 A1 | 10/2003 | Keech |
| 2003/0210708 A1 | 11/2003 | Belotserkovsky |
| 2004/0019564 A1* | 1/2004 | Goldthwaite et al. ......... 705/44 |
| 2004/0029569 A1 | 2/2004 | Khan et al. |
| 2004/0090992 A1 | 5/2004 | Lee |
| 2004/0097217 A1 | 5/2004 | McClain |
| 2004/0177005 A1 | 9/2004 | Poltorak |
| 2004/0193553 A1 | 9/2004 | Lloyd et al. |
| 2004/0243490 A1* | 12/2004 | Murto et al. .................. 705/30 |
| 2005/0138429 A1 | 6/2005 | Miura |

OTHER PUBLICATIONS

VISA; Verified by Visa; 2005, USA, p. 1.

Sankarson Banerjee, Senior Architect, Mphasis; Credit Card Security on the Net: Where is it today?; 2004, pp. 21-23.

VISA; How it Works; 2005, USA, pp. 1-2.

Encorus Technologies; Mobile Payments Examples: M-Commerce Opens up a World of Opportunities; 2002, pp. 1-11.

George Walsh and Gabriel Berger, Director of Research & Development, DCTI E-Payment Services; Alternative Payment Methods: Aug. 2000. pp. 1-8.

Vivo Tech; RF-Based Contactless Payment: A Moret Convenient Way to Pay; 2003, pp. 1-25.

Mark E. Peters, IBM Corporation; Emerging eCommerce Credit and Debit Card Protocols; pp. 1-8.

Tony Hegarty, Eric Verheul, Dirk Steuperaert, & Georgia Skouma; Study on the Secuirty of Payment Products and Systems in the 15 Member States; Jun. 2003, pp. 1-124.

* cited by examiner

METHOD FOR ELECTRONIC PAYMENT

This application is a continuation-in-part of U.S. application Ser. No. 11/061,616 filed on Feb. 22, 2005, European application number 04030898.3 filed on Dec. 28, 2004, U.S. application Ser. No. 10/964,654 filed on Oct. 15, 2004, and U.S. application Ser. No. 10/821,988, filed on Apr. 12, 2004, and claims the priority benefit thereof and which are incorporated by reference herein in their entirety.

FIELD OF THE INVENTION

This invention relates to payment methods in which a subscriber pushes credit or banking authorization to a vendor or merchant using the subscriber's mobile communications device. Actual credit card information may be supplied from on the mobile communications device or a remote database.

BACKGROUND OF THE INVENTION

Currently, consumers can purchase or shop while present at the merchant or vendor's location, or remotely, for instance by ordering over the telephone or through an electronic device over computer network like the internet. Payment for both local and remote purchases can be accomplished electronically by providing the merchant with an account identifier (credit card or debit card number, bank account number associated with a check, vendor's customer account, etc) through which payment can be authorized and funds can be transferred. The merchant generally receives the account identifier from the customer and bundles the identifier with the sale amount into a request for payment authorization. This request is generally forwarded electronically to an intermediary vendor to process the request for payment with the institution holding the customer's account, such as the credit card issuer, bank or other financial institution.

Such a payment system is subject to manipulation, theft and fraud due to the ease of access to the account information and difficultly in verifying the identifying of the person offering the account information as an authorized account user. For instance, if a credit card or credit card number is presented to the merchant, or input into an unsecured internet site, the merchant has access to the account information and the user's personal information, and such can be copied and later used by the unscrupulous employees for purchases. Scanning the card at the merchants location, or inputting a card into a secured internet site, can help alleviate theft of the consumers account information as the actual account information is not "visible" by the merchant's employees but is processed electronically. In a voice transaction, however, such as by ordering over the telephone, the account information is generally unprotected and subject to errors, particularly if a call center is handling the transaction.

The problems with theft of account information are well known, and various means have been implemented to combat theft and fraud. For instance, some account issuing institutions are now offering an "account identifier" that is valid for a single transaction. A more secure system is needed to handle payment transactions. In particular, as mobile cell phone technology becomes more prevalent, transactions initiated by cell phone are even more vulnerable due to unsecured nature of the cell path. The problem with cell technology will become event more aggravated due to the convergence of cell phones with internet enabled devices, such as the RIM Blackberry type services. With the expanding adoption of mobile cellular phones, a more secure system is needed to address payment systems for voice transactions. Today there is no method that allows a Purchaser to use a communications device to automatically transmit the Purchaser's pre-stored payment information (credit card number, bank account number, PIN, verification address, etc.) and other information necessary to complete a purchase. Additionally there is not a system that allows the financial institution to reduce its exposure to fraud by eliminating the verbal communication of credit or banking information, providing the additional security of having the Purchaser physically inputting a PIN number and the ability to grab the Purchaser's called ID or Internet address to further confirm the Purchaser's identity.

Transactions conducted over the Internet require the consumer to input the same information as required for a verbal order, which exposes the consumer to the possibility of the theft of the consumer's credit or debit card information and the consumer's personal data. Transactions where the card holder is not physically present are known as "card not present" or "MOTO" (mail order/telephone order) transactions.

Card Verification Value (CVV2) which is also known as CVC2 or Card Identification Number (CID) has been in use for over ten years. The system is basically a 3 digit or 4 digit numbers printed on the credit card separate from the actual credit card number and is not on the magnetic stripe. The merchant, whether via the Internet or telephone, asks for the number at the same time the card number is provided to the merchant. This number is then passed along to the verifying institution, which confirms that the card is in the presence of the cardholder. This method is subject to fraud, such as in the case of a criminal obtaining the credit card number may just as easily copy the CVV2 number. When cards are swiped and thus stolen electronically, the CVV2 number is copied at the time of the swiping and provided to whomever the card number is sold.

MasterCard's most recent security enhancement, in response to consumer demand for greater security and privacy in card not present transactions, implemented a system MasterCard named "MasterCard SecureCode". This system requires that the consumer, in an Internet transaction, to input a private code (that has been given to the consumer by the bank that issued the card), name address, etc., into a "pop-up" screen that appears on the Merchant's web page when the consumer has notified the web page that the consumer has completed the order. The consumer then inputs his/her private code and the authentication value is then passed along to the issuing bank in the merchant's normal authorization process. Using the MasterCard Secure-Code system thus eliminates the possibility of "one click" purchasing, requires that the merchant install a SecureCode compliant "plug-in" application on the merchant's web site, and still provides the merchant with the consumer's credit card and other personal data. This method, while improving security over the previously existing system, is cumbersome and does not accomplish the objective of keeping the consumer's card number and personal information hidden from the merchant and improve ease of use by the cardholder. This method does not allow for notification to the consumer of the purchase, nor does it add security or ease of use to transactions conducted verbally using a cell phone or land based telephone.

Visa's most recent security solution is called "Verified by Visa" and using Three Domain security (3D or 3D-Secure), which operates by the cardholder inputting a personal identification number (PIN) into the merchant's web site when requested. This solution does not work on telephone sales (as the PIN would have to be verbally given to the merchant's call center employee) and is cumbersome to operate on the Internet.

The Verified by Visa process works in the following steps in an Internet transaction:

1. The cardholder enters payment details using the merchant's web page.
2. The cardholder is automatically directed to the card issuer's server, who generates a pop-up screen on the consumer's computer.
3. The issuer authenticates the cardholder via the cardholder inputting his/her PIN number of password.
4. The issuer then transmits to the cardholder a digitally signed approval, which is then retransmitted to the merchant's server to begin the normal credit approval process.
5. The normal credit approval process begins after the authentication process in order for the digital authorization from Visa to be included with the authorization request from the Merchant to Visa or, more likely, the authorization service for the card issuer.

Verified by Visa requires that the cardholder send the purchase authorization request from the consumer's computer to the merchant, who then send the request to Visa's server, who then sends the request to the issuer's server. The issuer's server prompts for the password from the consumer, who then inputs the password or PIN, sends it to the issuer's server who then sends it to their (the issuer's) authentication server. The issuer's server then sends the approval to the consumer's computer who then passes the approval to the merchant's server. Then the merchant processes the payment for approval in the normal approval process and includes the authentication data along with the approval request to the card issuer for credit approval. Verified by Visa is cumbersome and will not work on telephone orders, and offers little compensation to consumers while taking more time to complete the transaction. Verified by Visa does not add the functionality of auto-filling forms on the Internet Merchant (or other merchants') customer relationship management (CRM) systems, allow "one-click purchasing', ties up Visa, the merchant and the authorization entity's servers, increases communications between all of these servers, thus increasing the possibility of a communications error or drop, and still exposes the cardholder's data to theft.

Surrogate Card Numbers have been tried by American Express (Private Payments) and by MBNA (ShopSafe). The surrogate card number is basically a system where the consumer uses a software application to generate a one-use credit card number that has a short validity period (normally two months or less) and a fixed charge value. The surrogate card number is tied to the consumer's "real" card number. This method is cumbersome (the consumer has to obtain the surrogate number and then keep track of it) and prevents the use of one click purchasing. Besides these issues, if surrogate numbers become widespread then, based on the current length of a credit card number (16 digits normally) there would soon be a shortage of numbers available. Of the 16 digits only 10 are available for actual account numbers as the other numbers designate the type of card, etc. With only ten digits available then there would be only ten billion possible card numbers—as there are over 700 million credit cards issued in the United States today that means that there would only be slightly more than 9 numbers available for each card—if just the numbers in the United States were used as a basis for the universe of total numbers. The Nilson Report, in its March, 2004 issue #807, listed total worldwide general purpose credit cards (excluding the store and gas named credit cards) totaled 1.96 billion. Using the worldwide number of bank credit and debit cards would thus leave only eight surrogate numbers per primary card.

None of the above existing methods are an elegant end solution that incorporates additional layers of security for both verbal and Internet transactions. Nor do any of the existing methods solve the combined problems of security, ease of use, and allow for one-click purchasing. Nor do any of the existing methods improve the accuracy and speed of the remote sales (MOTO) type transaction. Several of the above methods require additional hardware to implement and many increase the volume of communications (and thus the possibility for information theft and communications break down).

Currently in a normal MOTO or Internet transaction when there is a chargeback to the merchant the issuing bank and the consumer are fully repaid for the fraud loss. The merchant losses not only the amount of the chargeback, which he/she only received 97% to 98% of to start with (the merchant receives funds from the card issuer after deducting the card company's discount and fees) but also is charged in many instances a fee equal to $10.00 or more per transaction or more along with any shipping and handling charges that the merchant paid third parties.

On attempt to deal with these issues is with "smart cards" (example U.S. Pat. No. 5,317,636 (Vizcaino) and will increase the security and usability of the smart card. The smart card detailed in this patent generates a "transaction sequence number" that must be verified as correct by the authorizing computer. In order to be verified the transaction sequence number from the smart card must match the number in memory on the authorizing computer. The Vizcaino invention also provides for encryption and decryption of the data stored on the smart card, but the de-encryption algorithm on the approval computer must match the algorithm on the smart chip. This patent requires a smart card reader, does not allow for the autopopulating of merchant's consumer relationship management system software of the consumer's data and is not readily adaptable to telephone orders.

SUMMARY OF THE INVENTION

The invention allows the Purchaser an elegant solution to the above noted problems while increasing the security level in the transaction and decreasing the possibility of fraud to the financial institution.

The invention allows the Purchaser to pre-load into a data base all of the account information necessary to complete a purchase. The database may be located on the mobile communication device, or remote from the mobile device. At the time of purchase, the purchaser, in the example of using the telephone, calls the vendor or merchant, and request to purchase the item (books, reserve a hotel room or car, etc.). The needed account information is requested by the vendor though an intermediary to a mobile communications device of the purchaser. The purchaser uses the mobile communications device to transmit the account information data, using security features on the mobile device. The request for payment is routed to the financial account holder (e.g. a financial institution, credit card company, etc) and the return authorization ultimately is forwarded to the vendor to allow completion of the transaction.

The invention does the above without the requirement that the customer acquire new equipment.

Should the Purchaser lose the mobile communications device anyone finding it would be unable to complete a transaction because they would not be able to easily bypass the security features (such as requiring a PIN number) to access the information stored on the device. The use of the PIN or other security feature would allow companies to more closely control expenses that are charged to company accounts by increasing the ability of identifying the specific person who charged the item.

BRIEF DESCRIPTIONS OF THE DRAWINGS

DETAILED DESCRIPTION OF THE INVENTION

The invention is a generally a system that provides secure processing of sensitive information (such as credit card numbers) between a subscriber, a merchant or vendor (the party required payment or funding, and as later described, may be another subscriber), and an issuing bank (such as a bank, credit union, or other institution that issues credit cards, debit cards) in a transaction, such a purchase transaction. Other types of transactions and uses of the system will be later described. The System includes computers configured with software to communicate over data lines between the direct and indirect actors involved in a particular transaction. Direct actors in the transaction include the subscriber (an entity that has established a System account), the merchant or vendor, and the financial institution that has issued a credit card or other financial account to the subscriber (generally referred to as the "issuing bank"). The invention includes a system that acts as an indirect actor, acting as an intermediary between the direct actors to ensure secure data transmissions between the direct actors. Other indirect actors are generally present in the transaction; in particular, a credit card processor is usually employed as a front end intermediary to the issuing bank (See FIG. 3). First, the general communication channels between actors will be described.

1. General Communication Channels

Figure 2:
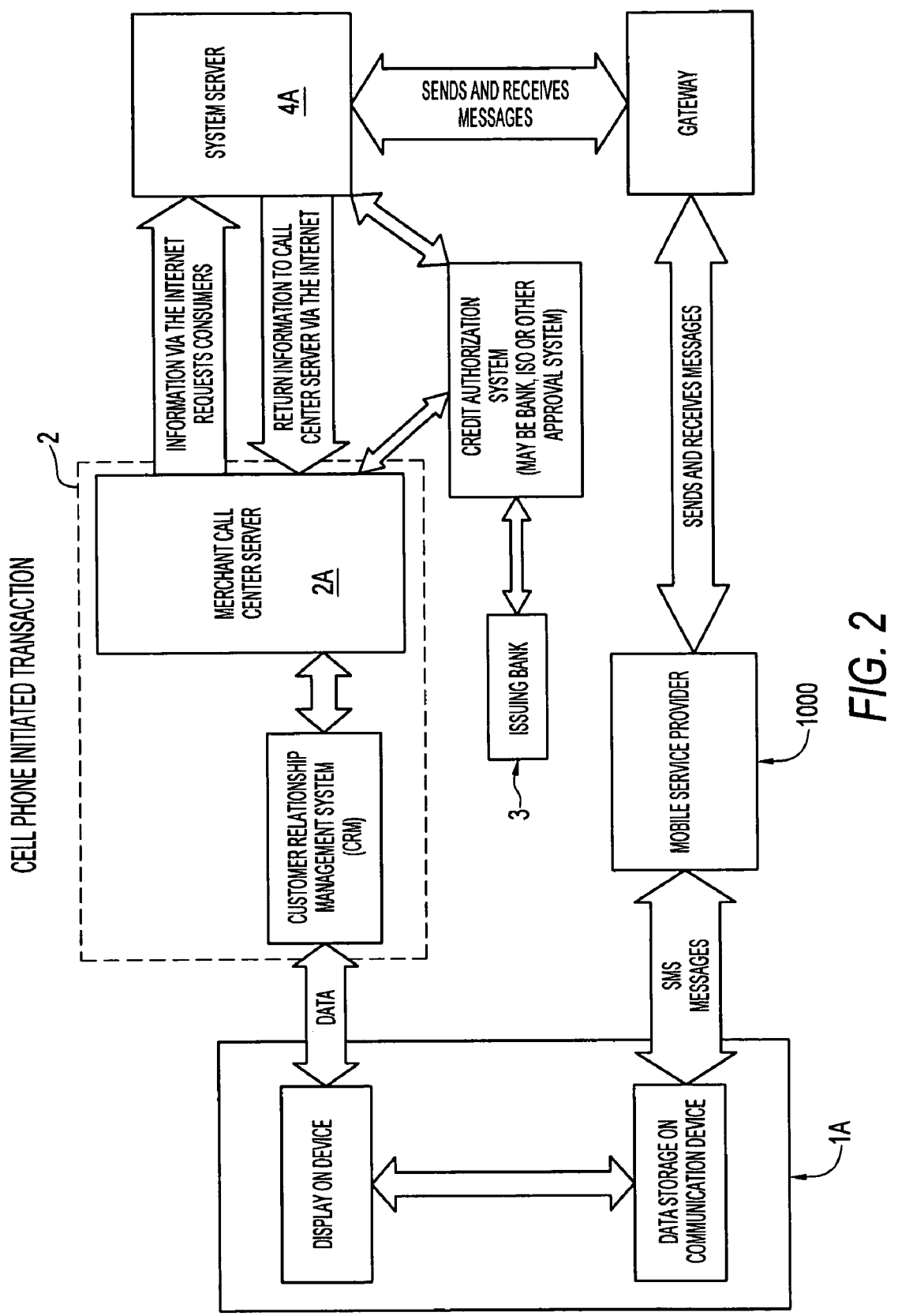
FIG. 2 is a schematic showing the communications between the interfacing platforms in a data initiated transaction
Figure 3:
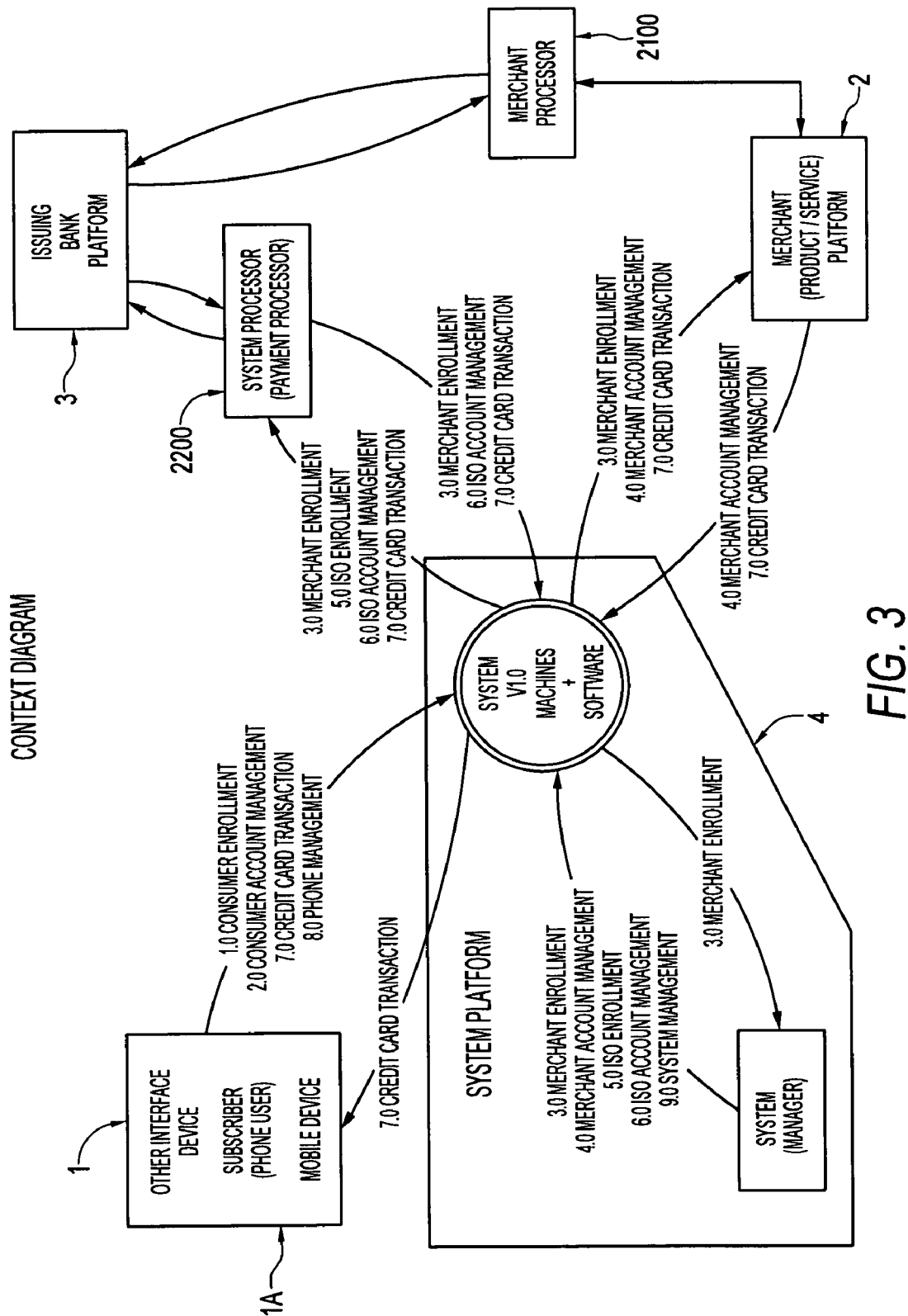
FIG. 3 is a schematic showing the general communications between the platforms

Communication for a particular transaction involves a subscriber mobile platform 1, a merchant platform 2, an issuing bank platform 3 and a system platform 4 (see FIG. 3). The merchant, issuing bank and system platform generally comprise one or more computers, each platform having its own internal structure, including networks, computers, databases, etc. Communications between platforms will be undertaken by computers, generally described as servers that communicate over networks, such as the Internet, or dedicated or dial up data lines. The subscriber mobile platform 1 includes a mobile device 1A that communicates (through intermediaries) to the system platform 4 computer through data communications, and possibly to the merchant platform using voice communications and/or data communications. The general communication paths are shown in FIG. 1 for a voice initiated transaction, and in FIG. 2 for an electronically initiated transaction.

Figure 1:
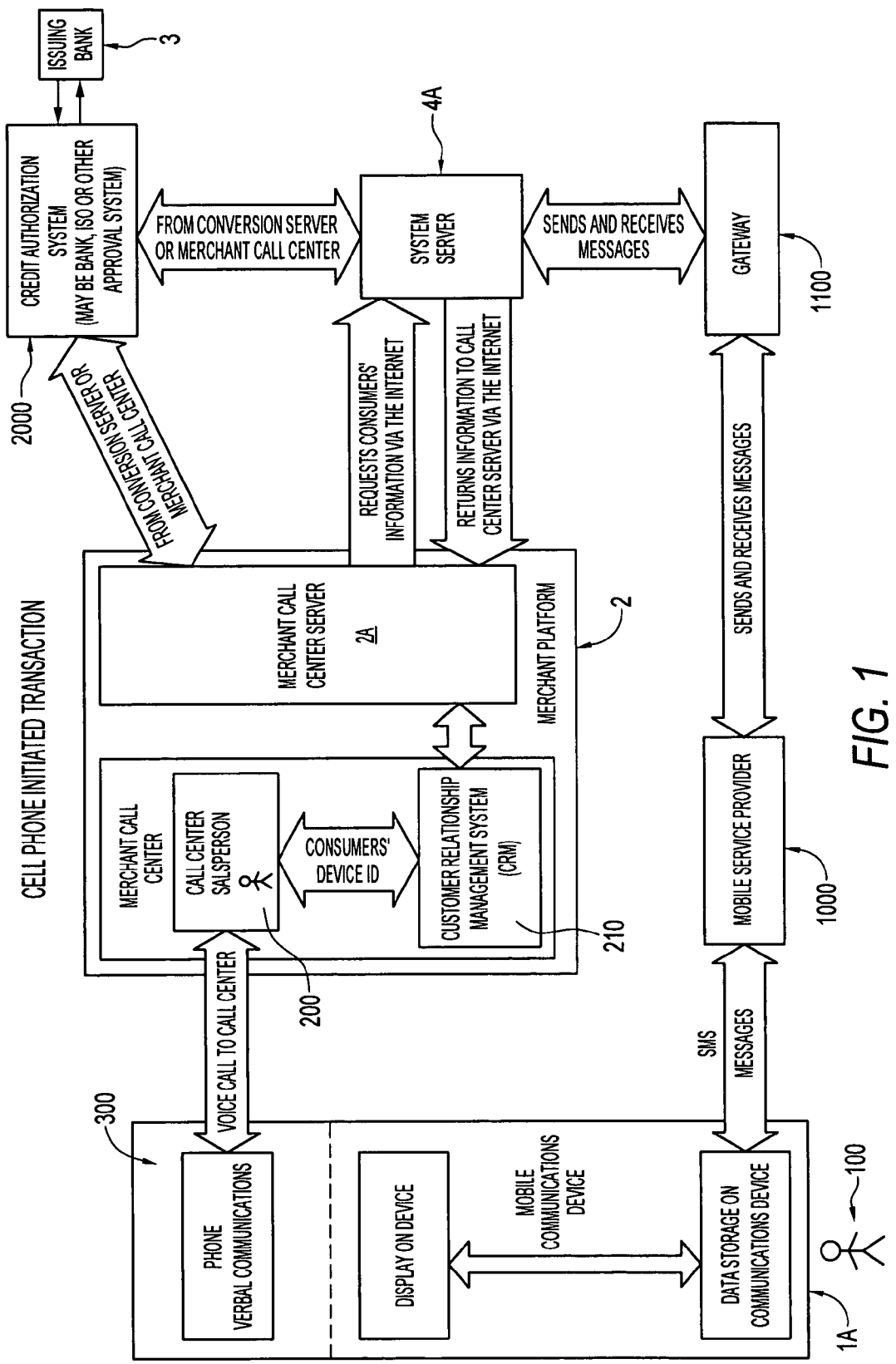
FIG. 1 is a schematic showing the communications between the interfacing platforms in a voice initiated transaction.

Shown in FIGS. 1 and 2 are the system server 4A (the "System Server") and the merchant server 2A. The System Server 4A interfaces over data channels to the merchant server 2A. Communication can be over the Internet or other network, dial up data line, or a direct data line. The System Server 4A will also communicate (through intermediaries, such as the mobile service provider) with the subscriber mobile device 1A. The System Server 4A generally does not communicate with the subscriber mobile device 1A through voice communications.

In the voice initiated transaction shown in FIG. 1, the subscriber 100 will initiate communication via telephone or other voice link with a vendor or merchant representative 200, possibly located in a call center. The subscriber 100 provides pertinent transaction information to the merchant representative 200 (such as items to be purchased). The merchant representative 200 enters the received data into the merchant's electronic ordering or transaction system 210, such as a consumer relationship management (CRM) system. The electronic ordering system 210 may be on a separate computer or the same computer as the merchant server 2A. The merchant's electronic ordering system 210 interfaces the merchant server 2A (possibly through a host or other computer) and the merchant server 2A communicates pertinent information on the transaction to the System Server 4A. The System Server 4A transmits selected transaction information to the subscriber mobile device 1A to be displayed on the visual display screen for the subscriber. The subscriber 100 will respond to the transaction information, for instance by sending an authorization to charge the transaction fees to a particular account. The System Server 4A will receive authorization information from the subscriber mobile device 1A and will communicate selected authorization information to either the merchant server 2A, the issuing bank platform 3, or both, depending on the configuration of the particular system. The issuing bank platform 3 will then communicate the status of the transaction (approved or declined) to the merchant server 2A, the System Server 4A, or both, depending on the system configuration. Transaction status can then be forwarded to the subscriber 100 through the merchant representative 200, to the subscriber mobile device 1A by the System Server 4A, the merchant platform 2 or both. As shown in FIG. 1, the voice communications can be established through the voice channel of the mobile cell device 1A (if so equipped), but the voice communications between the merchant representative 200 and the subscriber 100 can also be established through any other phone type device (cell, land line, VOIP, etc) 300, as indicated by the dotted line in FIG. 1.

The data flow in an electronically initiated transaction, such as an Internet transaction, is similar, except all transaction data is entered by the subscriber 100 electronically without interfacing a merchant representative 200. The subscriber 100 will access a suitable web site for the particular transaction (such as the merchant's web page) and enter the initial transaction data. The subscriber 100 may use any Internet connected device to initiate the transaction, including the subscriber mobile device 1A.

Obviously, these communication paths may involve intermediaries through which data is passed. For instance, positioned between the subscriber mobile device 1A and the System Server 4A is the mobile service provider's 1000 equipment. Additional intermediaries may be positioned between the System Server 4A and the mobile service provider 1000, for instance, data may pass through a third party vendor service provider machine that address interfacing issues with mobile service providers (as format is not standardized in the United States). Similarly, an intermediary can be positioned between the issuing bank platform 3 and the System Server 4A or merchant platform 2, again, to allow the intermediary to deal with interfacing, formatting and other issues that may vary between issuing bank platforms 3. Commonly, such an intermediary is a credit card processing entity, acquiring bank, credit card clearinghouse, an Independent Service Organization or other entity (generally referred to as a "Processor" 2000). A Processor positioned between the issuing bank platform 3 and the Merchant Platform 2 will be considered a Merchant Processor 2100, while a Processor positioned between the issuing bank platform 3 and the System platform 4 will be considered a System Processor 2200.

Another indirect player in a credit card transaction is the acquiring bank, (the sponsoring bank or merchant account provider) the institution that provides the "merchant account" to the merchant. The "merchant account" is the account that enables a merchant to process transactions with credit cards. In usual merchant credit card transactions, a Merchant Processor 2200 is positioned between the acquiring bank and the merchant. A Processor can include a payment gateway, a credit card processor, and other type of service provider.

A. Subscriber Platform Communications

The subscriber platform 1 includes a mobile communications device 1A that will generally be described as a cellular telephone, although other mobile devices (e.g., other wireless devices, such as PDSs, Blackberrys, etc) capable of supporting data exchanges can be used. Cell phones typically have a voice channel, one or more data channels and one or more control and signaling channels. With the convergence of cellular technology with Internet technology, the mobile platform described can be implemented on a wireless networked device, such as a PDA, Blackberry, laptop, etc, with or without voice capabilities. The implementing mobile device 1A should be equipped with a means to allow third parties to initiate electronic communications to the mobile device. For instance, with mobile cells phones, the means to initiate communications with the device is the unique cell phone number which can be found through the cellular network, thus providing the capability to initiate communications to the cell phone by a third party. With a wireless Internet accessible devices, the required ability for a third party to initiate communications generally requires that the device be associated with a mobile telephone number (such as reflected in the Blackberry device) or that the device have a static IP address to allow the mobile device to be located.

As wireless Internet devices (such as PDA or other personal communication devices) usage grows and VOIP becomes more prevalent (and ultimately migrates to mobile VOIP), it is anticipated that other technologies will be developed to allow third parties to initiate communications to such mobile devices. While the System will be described with a cellular phone embodiment 10 of a mobile device 1A, the invention is not limited to mobile cells phones as the mobile communications device. Every mobile device 1A must have processing capabilities, database storage capabilities, and location abilities (later discussed), and currently, it is preferred that the device be equipped with Records Management System (RMS). Each mobile device achieves its mobility as a wireless communications device. Currently, Motorola V series cell phones are suitable.

The overall system includes a mobile software module that resides on the subscriber's mobile communications device 1A (such as a cell phone), and may include a merchant software module that resides on the merchant platform 2 and interfaces with the merchant's electronic ordering system 210, and system server software that resides on the System platform 4. In general, communications between the System platform 4 and merchant platform 2 are accomplished by computers referred to as servers using the Internet, direct dialed communication lines, leased lines or other suitable network path or data line for the communication channel. Communications between the issuing bank platform 3 (again, generally described as being accomplished through a server computer) and other servers can be through the Internet, dial up data channel or a dedicated communications channel, generally provided through a Processor 2000 intermediary. Communications with the subscriber's cell phone 1A from computers in the System will be over either the cell data channels or the cell control and signaling channels (all of which are considered data channels). The particular communication protocol to the cell phones data channels can vary as no one standard has been adopted (at least in the United States), and the invention is independent of such. Generally, variations in interfacing with a particular cell phone are addressed by the cell service provider and are transparent to the System platform 4.

Communications to/from the System Server 4 A to the subscriber mobile device 1A can be Internet formatted (i.e. hyper text transport protocol (HTTP) of hyper-text markup language (HTML) messages). However as most cell mobile devices are not equipped to handle full HTML transmissions due to the limited processing/visualization nature of the cell mobile device, the HTML transmissions (or other type format utilized) from/to the System Server 4A will usually be converted to a suitable format for transmission/reception by the mobile device. A software/hardware interface is required convert the HTML transmission to a format usable by the cell device. One common typical interface is a gateway 1100. The gateway will normally be controlled by the mobile service provider. For instance, if the mobile device is WAP (wireless application protocol) enabled, the gateway would be a WAP gateway, converting WAP/WML (wireless markup language) to HTTP/HTML. However, the current embodiment of the device uses short messaging system (SMS) transmission for communications with mobile cell phones due to the large number of mobile devices that are not WAP enabled and the uncertainty of WAP's future. Further, shortcode SMS style transmissions can be used, where normal style SMS requests are typically tied to a real phone number, while short codes can be set to a virtual phone number. Most mobile cells have SMS capability, and hence, the gateway is considered a SMS gateway converting HTML to SMS. For PDA's or other non-voice mobile devices, WAP (or other accepted standard) communications protocol can be used.

An added advantage of SMS is that most mobile voice devices allow simultaneous SMS messaging capability and voice communication. On some mobile cell phones, data channels and voice channels cannot be used concurrently using WAP data communications. The ability to simultaneous use voice/data communication within a single transaction, as later described, is an additional reason to adopt SMS communications. One drawback of SMS communications, however, is that only short 120-160 byte messages can be sent via SMS (a limitation of the SMS system). Hence, as mobile data communication technology develops, other communication protocols may be adopted for use in the system for the subscriber platform mobile communications device.

SMS messages will be used to communicate with the applications program residing on the mobile device 1A. Hence, the initial SMS "System" message will "start" the appropriate system application program on the mobile device. The mobile device 1A is generally equipped with an applications management system (AMS) to coordinate and manage voice communications, data communications, and application programming stored on the device. Hence, the initial System Server 4A message contains an identification of the application program to be started on the mobile device (the "app id"). The System message is converted to SMS by the SMA gateway 110, and the AMS extracts the app id and starts the identified application program on the mobile platform 1A. The mobile device system applications program informs the resident AMS program that keyboard input or other inputs on the mobile device should be routed to the executing mobile device application program and not to the cell phone voice call program. Hence, if the user is using the same mobile device for the voice call (for instance, by using headphones, a speakerphone option, or simply shuttling the device between an ear position for voice and other positions for inputting data), then keyboard entries used for data transmissions to the System Server 4A will not disrupt the voice conversation.

Generally, each SMS message will pass an identifier to notify the AMS of the proper recipient of the incoming data (the app id). At the end of the application, AMS is notified of application closing and may be configured to close program features (such as clean up the related resources, return keyboard operations to the cell voice program, etc).

B. Merchant Platform Communications

The merchant platform 2 must communicate with the System platform 4 pertinent information concerning the transaction, such as merchant ID, transaction value, subscriber id. To facilitate this communication, a system merchant software module may be installed on the merchant platform 2 to work in conjunction with (or integrated into) merchant's electronic ordering system 210 to (a) capture pertinent information from the System platform 4 communications and pass to the merchant transaction software 210 (such as the CRMS software); and (b) to capture pertinent transaction information from the merchant transaction software and pass to the System Server 4A. Many merchant electronic transaction systems are industry standard applications and the merchant system software module (if utilized) can be standardized. However, some merchant electronic transaction systems are custom developed installations, and hence, the system merchant software module would require a degree of customization.

An alternative to providing merchant system software module would be to allow the merchant to configure the merchant server 2A to communicate with the System Server 4A by establishing data types and formats for data transactions between the two platforms and use established communications services to request and exchange data between the platforms. One such communication service would be employing a Web Services environment using existing s protocols, such as web services description language (WSDL), Universal Description, Discovery and Integration Service (UDDI) and SOAP. In this fashion, each party (the merchant or the system server) can determine what information is needed from the other party for its ongoing subscriber transaction, and request such for the other party.

Currently, communications between the System platform 4 and merchant platform 2 are implemented between their respective servers using the Internet as the data channel. However, dedicated or private networks could be utilized if the volume justified cost expenditures, and frame relay Network services could be employed. Alternatively, instead of communicating with the merchant platform 2, the System Platform 4 could communicate with the merchant platform 2 through the Merchant Processor 2100. This is generally not preferred, due to substantial modifications in the existing infrastructure that would be needed.

C. The System Platform Communications

The communications at the System platform 4 will be more easily described in a detailed description of a transaction, described below and detailed in general in FIG. 7. In the transactions described, communication will be referred to as being between platforms (e.g. merchant platform, system platform), and generally, this refers to communication between computers, and for Internet communication, between servers.

2. Transactions

A. The Voice Initiated Transaction.

In this transaction, the subscriber 100 initiates a voice link to the merchant representative 200. The subscriber 100 also has a mobile communication device 1A that includes a processing unit, memory, and data communications interface. Stored in the mobile communications device 1A or the System platform 4 databases will be relevant transactional information, such as credit card information, personal identifying information (name, address, shipping address, etc), shopping preferences, and other subscriber supplied information. The mobile communications device 1A may be a cell phone, and that cell phone can be the voice link and data link for the transaction. This simultaneous or near simultaneous data/voice communication reduces the transaction time, allows for accurate transmission/collection of data, and more secure transmission of data as will be later described.

Figure 7:
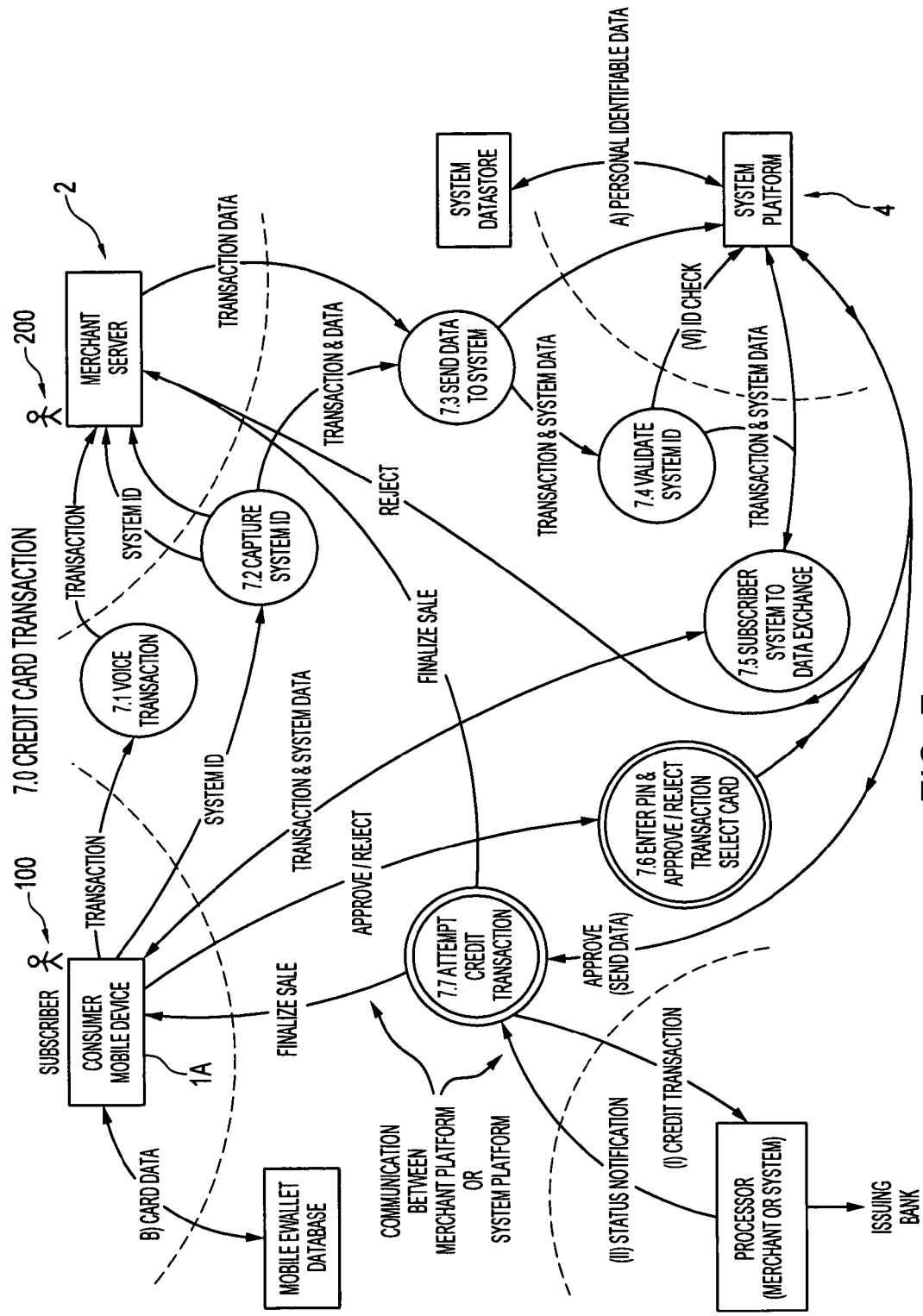
FIG. 7 is a process diagram showing the process of a credit card transaction using the System.

A typical voice transaction proceeds as follows as shown in FIG. 7. The subscriber 100 contacts the merchant representative 100 using a voice link 7.1. A determination is made that the transaction is a System assisted transaction (see 7.2). That knowledge can be verbally communicated between the subscriber 100 and merchant representative 200, or the System platform 4 may identify the caller as a subscriber. Such a determination could be automatically made if the merchant has caller id and the call identifiers are captured (potentially bundled with the merchant identifier) and passed between the merchant platform 2 and the System platform 4. The System platform 4 will check the specific call identifiers against its stored subscriber records to see if the call identifier matches a System subscriber. If a subscriber is identified, that information can be electronically passed to the merchant representative 200 thorough the merchant platform/System platform communications described above, possibly bundled with subscriber personal information data stored on the System platform 4 (if this option is set by the subscriber). Alternatively, if a subscriber is recognized, the System platform can be configured to inform the subscriber mobile device 1A of the initiation of a merchant transaction, and request authorization to communicate personal information data to the merchant platform, and if authorized, transmit from the storage location (either the mobile database or the System database). Such transmitted personal information can be captured by the merchant's electronic ordering system for population of needed transaction data fields.

If automatic recognition of subscriber status is not achieved (for instance, the phone number does not identify a subscriber), the merchant representative 200 would verbally determine that the transaction is system assisted, and verbally request the subscriber's System account identifier (hereafter, the "Subscriber ID") and enter that identifier into the merchant electronic ordering system where it will be communicated to the System platform for further processing. The subscriber ID can be the Mobile communications device cell number or other number. In any event, the System platform 4 will validate the id and check to see if the subscriber is in good standing prior to allowing further use of the System (see 7.4).

After identification of the transaction as a System assisted transaction, an interchange of data between the subscriber mobile device 1A and merchant platform 2 takes place (through the System platform, see generally 7.3 and 7.5) with data sent from the mobile database or System database under the control of the subscriber. A typical interchange is as follows. The System Server 4A receives the merchant identifier and other vendor supplied information from the merchant platform 2. The System platform 4 identifies the subscriber's "active" or default mobile device from the System database (in the event the subscriber has more than one mobile devices identified as subscriber mobile devices), and notifies that active mobile device 1A of a pending transaction with the merchant (generally, 7.5) (using the merchant id or an identifier related to the Merchant id). The information from the System Server 4A is displayed on the visual display of the subscriber's mobile device 1A.

After notification, the subscriber has the option to release subscriber information stored (either on the mobile database (sometimes referred to as an "e-Wallet") or the System database) to the merchant platform 2. The subscriber 100 chooses his response, for instance, to authorize the release of pertinent subscriber information from a selected personal information (PI) data file located on the mobile device memory or the System platform database. Authorization may be conditioned upon the user inputting a password, personal identifier number (PIN), biometric data input (such as from a fingerprint reader, speech recognition module, signature reader, feature recognition module, etc) or other security entry, from the mobile device (such as from a fingerprint reader located on the mobile device) (see 7.6). If authorization is granted, relevant subscriber information can be passed from the storage database (either the System or Mobile database) to the merchant platform 2 through the communications link between the System platform/merchant platform (data stored on the mobile device database would be first passed to the System platform 2 (possibly for decryption) for transmission to the merchant platform 2).

If subscriber data is stored on the mobile communications device database 1A, it is preferred that the data be stored encrypted. Decryption may be accomplished at the System platform 4 with a decryption algorithm or key stored on System platform. Thus, subscriber PI information (e.g. name, home address, shipping address, relevant shopping preferences, applicable discounts) stored on the mobile database can be passed over the mobile data channels in a secure and protected fashion. The communication channels between the merchant platform 2 and System platform 4 can also be secure, such as using a dedicated communications channel or by employing Secure Socket Layer (SSL) technology or other security technology measures.

The PI data can be passed to the merchant's electronic ordering system from the storage site to populate data entries for the particular transaction. While PI information can be passed by voice communication to the merchant representative, use of stored PI data can speed the accuracy and reduce transaction time. Alternatively, the Subscriber PI information (or a subset), if stored on the System databases, can be transmitted upon receiving release authorization from the subscriber, and such authorization can be pre-granted as a subscriber option set during subscriber account configuration.

The subscriber 100 verbally indicates to the merchant representative 200 the desired transaction (e.g. purchase airline tickets, reserve hotel room, purchase shares of xyz stock, etc.), and may verbally provide PI data if such is not automatically provided by the System platform database (or certain needed PI data is not stored in the mobile device memory or System platform database). At the completion of the transaction, the merchant totals the transaction amount and details of the transaction are passed between the merchant platform and the System platform (see 7.3) for transmission to the mobile communications device 1A (see 7.5). Additionally, the merchant will also send a request for payment, or the System can be configured to recognize that the transmission of the transaction details is an inherent request for payment. The pertinent transaction details are displayed on the mobile communications device visual display (such as transaction costs and merchant identifier or transaction identifier) and the system application software resident on the mobile device will request the subscriber to authorize payment for the displayed transaction.

If the Subscriber desires to pay the transaction charges, the subscriber indicates acceptance through the mobile device and the resident mobile application program will display available account identifiers (such as credit card accounts) from which to authorize payment (see generally 7.6). The "account identifiers" displayed on the mobile communications can be stored on the mobile database or be transmitted from the System platform in response to subscribers input authorizing payment.

Before displaying the available "account identifiers", the system (either the resident mobile application or the System server) can be configured to request identify verification, such as with a PIN number, biometric data, facial feature match input through a mobile phone camera, etc. (the verification can be requested prior to display of available accounts or upon selection of the account information) (see generally 7.6). If subscriber identity is properly verified, the account identifiers will be displayed on the mobile device's visual display to allow the subscriber to select a particular account for payment. The actual credit account numbers are generally not displayed on the mobile device (for security reasons), but account identifiers, or account aliases, will be displayed to the subscriber that are recognizable to the subscriber (generally, the subscriber will determine what is to be displayed during data entry, later described), such as BankAmerica card 1, BankAmerica card 2, or card number *****4216. The subscriber 100 selects the account identifier selected for payment, and such is transmitted through the mobile device 1A to the System platform 4** for further processing. Additionally, the System platform can be configured to request subscriber identity for each account selected (for instance, each account may have a separate PIN number needed to allow the user to authorize selection of that account for payment. Such a separate PIN number is not generally the same PIN number that the issuing bank may assign to a particular account, such as a debit card.

If the true account information is stored on the mobile database, the selected account identifier is linked to the encrypted account information (e.g. account number, Bank PIN number, CID number, etc) stored in the mobile database, and the encrypted actual account information will be sent from the mobile database to the System platform. If the true account information is stored on the System database, the selected account identifier (or a value associated therewith) is transmitted to the System platform 4 and will be linked or identified with the actual account information by the System platform 4 for further processing.

The account information can be encrypted on the mobile device in a variety of fashions, such as by transmitting partial account information (encrypted or not encrypted) to the System Platform 4, with the System Platform 4 supplying the missing account information from the System database, (either with number overlap to allow for proper re-assembly or with an assembly value or other indicator to allow for proper assembly of the mobile database portion with the System database portion). Other encryption schemes can be used, such as by having the data encrypted with a decryption key stored on the System platform, etc.

Once the account information is received or identified by the System Platform 4, the issuing bank platform 3 for the identified account must be notified of the pending transaction and requested to authorize payment. Several alternatives are available to further this aspect of the transaction. In one embodiment, if the account information is System encrypted, the Server platform will decrypt the information and either: (1) forward the decrypted information to the merchant platform for forwarding to the Merchant Processor for processing; or (2) bundle the account information with other necessary information (merchant id, transaction value, etc) and forward the bundled request to the issuer platform though a System Processor 2200 or the Merchant Processor 2100 in order to authorize payment. (see generally 7.7 and FIG. 1). In some instances, the System Processor may act as a Processor and directly send authorization to the pertinent issuing bank. The necessary routing of the authorization request is generally merchant dependent, and will be established when the merchant account is set up within the System.

If the account information is forwarded to the merchant platform 2, the merchant electronic order system 210 will bundle the account information with transaction information and send such to the issuing bank platform 3, generally utilizing the Merchant Processor 2100 as intermediary (see FIG. 1). In either embodiment, the actual account information is generally not visible to the merchant representative 200, but is visible generally only electronically to the merchant host electronic system, or the Processor.

As described, it is preferred that the actual account information be stored encrypted if stored on the mobile device 1A. If decryption is to be done at the System platform 4, the decrypted information will be forwarded by the System platform 4 to the appropriate entity (generally, the Processor). In other embodiments, the account information can be encrypted by the issuing bank as later described, in which case, the account information will have to be forwarded by the System platform 4 encrypted, but the routing information (e.g. bank id) will not be encrypted to allow the encrypted account information to be properly routed to the appropriate issuing bank.

Upon return of the authorization status (e.g. "denied" or "approved") from the issuing bank platform 3, it is preferred that all platforms be informed of the authorization status. Hence, the platform receiving the authorization status should forward such to the remaining platforms. For instance, if the System platform 4 receives the authorization (such as through the System Processor 2200), such must be forwarded to the merchant platform 2 for processing. It may be desired to notify the subscriber 100 of the authorization status, either through the System Server/mobile device communication link, or by the merchant representative. The mobile device application software may be configured to stay active after selection of an account in order to receive the authorization status and to allow the subscriber to select another account for payment if the returned status is "denied." In the current implementation, once the request for authorization is made and account identifier selected and transmitted, the System mobile applications software may log the transaction request, and close.

Generally, the System platform 4 will log appropriate details of the transaction for future reference (such as needed for later charge backs, System management reports, merchant reports, and subscriber reports) and billing purposes. A particular transaction can normally be identified by a combination of data, such as date, subscriber account, merchant id, bank id, and transaction amount, and transaction id if provided by the issuing bank. If additional identifiers are needed, the System platform can generate a unique ID per transaction (e.g. include a time stamp or generate a separate transaction number). Indeed, in transactions where the merchant is not provided with the account information, a transaction number (either System platform generated or issuing bank generated) may be needed by the merchant to track the transaction for future references, for instance, in the event of a charge back.

B. Data Initiated Transaction

In a data initiated transaction shown in FIG. 2, the transaction is initiated electronically without a voice component, such as through a laptop, desktop, wireless enabled PDA, etc. If the transaction is performed from a secure link and the subscriber has access to the subscriber's account information, the System will not add significant levels of security. The system can help further the speed of the transaction by providing PI information to populate data fields in the merchant electronic transaction system. If the transaction is over a non-secure link or the subscriber lacks physical access to the subscriber's account numbers (e.g. credit card numbers), then the System adds significant functionality to a transaction.

In a data initiated transaction, the transaction proceeds much like the voice initiated transaction but all information is supplied electronically Here, the subscriber will have to indicate that the transaction is to be System assisted, and provide the merchant's electronic transaction system 210 (e.g. web based ordering system) with the System subscriber identifier in order for the System platform 4 to contact the subscriber's mobile communication device 1A. Authorization and selection of the account to be charged is handled as in the voice initiated transaction.

As described above, information is passed in a series of events between the System platform 4 and merchant platform 2 prior to the authorization request. Alternatively, the merchant can receive all information from the subscriber (PI information, subscriber ID, shopping selections) and send a single request for payment authorization to the System platform 4. Many existing electronic ordering systems have means of populating datafields for "return" customers, and in such an environment, the merchant may determine to contact the System platform 4 only for payment authorization.

C. Other Types of Transactions:

(i) Point of Sale Transaction.

Presently credit and debit cards are constructed from plastic or PVC (polyvinyl chloride) and contain a magnetic stripe on the back of the card. New generation device cards include smart cards or RF enabled cards, each having a computer chip with information stored and readable from the chip. In general, the cardholder's name is embossed on the front of the card along with the card's expiration date and the actual credit card number. The back of the card contains the magnetic stripe encoded with pertinent information along with a three or four digit card verification number. For other types of cards, information can be stored electronically on the card. Stored information includes the account number, the cardholder's name and additional information such as the authorization process required and discretionary data that is proprietary to the card issuer.

Using the existing credit card methodology of having the same number for both the consumer account number and the consumer credit card number means that, in order to track a sales transaction, the merchant must store the consumer's credit card number, a practice that leads to fraud due to hacking of the merchants' CRM systems or electronic transaction system.

The System can include a "credit card" type device that has encoded on the card a subscriber account number and routing information to the System Server or System platform. In this embodiment, at the point of sale, the System "credit card" can be presented to the merchant (or the card number verbally given to the merchant) (say at a restaurant, or an ATM) and scanned by the merchant at the POS. The scanned information, as well as merchant id and transaction amount, is forwarded to the System platform through the routing information contained on the System card, or may be routed to the System by the pertinent Merchant Processor, or if present, by the merchant electronic ordering system, if present.

The System platform 4 can then operate in the same modes as specified above for a data transaction in conjunction with a System "credit card"—request payment authorization through the subscriber mobile device 1A as described above. In this instance, however, there may be no sophisticated merchant platform present (for instance, in a small restaurant, the "merchant platform" may only be card swipe technology). In this event, communications with the System may be through the Merchant Processor 2100 or directly between the System platform 4 and the low technology merchant platform 2 if the existing merchant technology can be configured to communicate directly with the System platform 4 instead of the Merchant Processor 2100).

Additional payment features can be included on the mobile's system application software, for instance, allowing for approval of an amount in excess of the request to account for tips. Again, if the System platform 4 forwards the request for authorization to the System Processor 2200 and then receives the authorization status, the System platform 4 will have to pass the authorization status (including the authorization code) to the Merchant Processor 2100 or merchant platform 2 for further processing. An alternative method would be to have the issuing bank notify the merchant electronic system 210 (generally through the Merchant Processor 2100), but in this case, additional transaction identifier(s) may be required to uniquely identify the transaction to which the authorization attaches.

The advantage of the System card at a POS sale is that the merchant's employees have no opportunity to capture the actual financial account information. Further, if the card is lost or stolen, magnetically swiped or electronically read (in the case of a smart card) the information is still useless, as upon use of the card, the subscriber's mobile device is contacted for approval, thereby notifying the subscriber of a third party trying to use his card. It can be possible (if account identifiers are stored on the System databases) to allow the Subscriber to configure his account with a "default" account number, that is an account which is automatically selected unless overridden by the subscriber. Also, the subscriber may configure his account to allow use of a default card even with confirmation from the mobile communication device. This feature is not recommended due to the inherent associated security risks.

(ii) Consumer to Consumer (CTC) Transaction (ii)(a) Subscriber to Subscriber

A CTC transaction is a request to transfer funds from one of the subscriber's accounts to another subscriber's financial account or to fund another subscriber's transactions. The first instance is to allow a System subscriber to fund another System subscriber (for instance, a parent funding a child's bank account, or funding the purchase by the child at a store, etc). The transaction can be initiated by either the funding party or the party requesting funding, as will be described. In this instance, the subscriber requesting funding (or payment) is the "merchant" for purposes of the System, and the requesting subscriber's mobile device will be the merchant platform.

Suppose Subscriber A desires to request funding from Subscriber B for a transaction. Subscriber A must have subscriber B's System ID number. Subscriber A activates the CTC function on the mobile application program (or the non-mobile application program, for instance at a desktop or through the System web portal), inputs subscriber B's System id (which can be stored in Subscriber A's mobile or System database) and the requested amount. Subscriber A may also enter an account identifier to receive the funds (the funded account) if the transaction is a simple transfer of funds between subscribers. In a merchant/Subscriber A/Subscriber B transaction, the merchant could request funding from the customer, Subscriber A. Subscriber A's device gets notified of the pending transaction, and Subscriber A activates the CTC feature and requests Subscriber B to fund the transaction (identify subscriber B, and request authorization for payment by Subscriber B).

The CTC information is forwarded to the System platform 4 (along with an identifier of the request as a CTC request). The System platform 4 sends the request to Subscriber B's mobile communication device with a request to fund, as in a normal merchant transaction. If the Subscriber A is requesting that funds be transferred to a merchant, the merchant identifier may be presented to Subscriber B; however, if Subscriber A desires funds to be deposited in a bank account, the actual account number will generally not be transferred to Subscriber B's mobile unit due to security concerns. Instead, some type of identifier or encoded identifier will generally be provided to notify Subscriber B of the nature of the account to be funded, such as the account alias.

If Subscriber B agrees to fund Subscriber A's transaction, Subscriber B selects the funding account identifier (using the identify verification process if in place) from those displayed on his mobile communications device, and transmits this information to the System Server 4A. The System platform 4 then transmits the needed transaction information (e.g., funding account, funded account, funded amount, request for authorization) (possibly after decryption) to Subscriber B's identified issuing bank for payment authorization, and if authorized, for funding of the Subscriber A transaction. Subscriber A's request to fund a transaction can be held by the System (generally at the request of Subscriber A) for a period of time (a sunset period) to account for the unavailability of Subscriber B (for instance, Subscriber B may be remote from his mobile communications device, asleep, etc) with the System platform 4 attempting to deliver the funding request during the sunset period.

Note that the above CTC transaction can be handled in a variety of fashions for added security. For instance, Subscriber B can request his issuing bank for authorization to transfer, but delay actual transfer pending transfer authorization. If the funding authorization is granted, Subscriber A can be provided with a transfer "token," such as a transfer password by the System Platform. Subscriber B can provide the transfer token Subscriber A by voice, email, text message etc. Within a given time window, Subscriber A could access the System platform (such as through the System web portal using the mobile device or a desktop), provide the transfer token information and transaction number or Subscriber ID. The System platform would verify the correctness of the token/transaction (possibly requesting identity verification if a system subscriber), and forward the funding authorization to the proper issuing bank to transfer or fund the previously authorized payment.

The above transaction can also be initiated by the funding party. In this instance, Subscriber B desires to fund an account for Subscriber A (for instance, a parent desiring to place funds in a child's debit account). Subscriber B activates the CTC feature, and identifies Subscriber A (such as by Subscriber A's ID), funding amount, and Subscriber B's funding account. As an option, Subscriber B may also provide the account id of the funded account (for instance, the mobile database or System database can have stored (encrypted if needed) account numbers of third parties for CTC funding purposes). Again, the System platform 4 requests the identified issuing bank to authorize the transaction, and if the funded account information has been provided, the System can enable the transfer and may provide notification to Subscriber B of the transaction. If the funded account information has not been provided, the System will contact Subscriber B's mobile device and inform Subscriber B of the details of the CTC funding transaction and request an account to be funded. Subscriber B selects the account identifier from those displayed on the mobile display, and sends the selection to the System Server. The System platform bundles the request on to the appropriate issuing bank through the pertinent Processor. Again, the "funding request" transaction can be held within the System until both Subscriber's have interacted with the System. Generally, the System platform 4 will notify each subscriber of the status of the transaction, and will log appropriate details of the transaction for future reference and billing purposes.

In a CTC transaction initiated by a subscriber requesting funding, the funding Subscriber can refuse to fund or modify the amount to fund (reduce or increase).

(ii)(b) Subscriber to Non-Subscriber

Finally, the CTC feature can be used to fund a non-Subscriber account. In this instance, the Subscriber must have access to the non-subscriber's account information (such as bank information). The subscriber would access the CTC features and select the funding account and enter the funded account. The transaction would be forwarded to the System platform for handling (authorization request, and transfer request). Again, it may be desirable to provide the non-subscriber with a transfer token, and have the non-subscriber log onto the System Server Web portal as a guest and provide the transfer token to complete the transaction. Funding a non-subscribers account presents some security risk as the non-subscriber's account information must be entered in non-encrypted format. However, if the transfer is requested through the System internet portal from a desktop or laptop, and that link is a secured link, it reduces the security risks. One option for dealing with non-subscriber transactions is to force the non-subscriber to interface with the System platform, such as by accessing the System platform through the web portal. In this instance, the Subscriber authorized a transfer to a "BLANK" account, and hence, the subscriber would not need to enter the non-subscribers account information. The system would provide the subscriber with a transfer token and possibly other transfer ID information, and such would have to be provided to the non-subscriber (such as by voice phone, e-mail (either Subscriber e-mail or System platform e-mail), etc). The non-subscriber would have to log into the System web portal as a guest, and access the transaction (e.g. with the transfer token). The System platform 4 would then request the funded account information to be input by the non-subscriber. The transfer would then be forwarded to the appropriate issuing bank for funding authorization.

For definitional purposes, all of the above transactions are considered "credit card type" transactions as each transaction requires the subscriber to identify an account (debit, credit, bank account, etc) from which to pay the transaction costs.

3. Acquiring a System Account and Storing Data on the Mobile Device.

A. Subscriber Account

Figure 8:
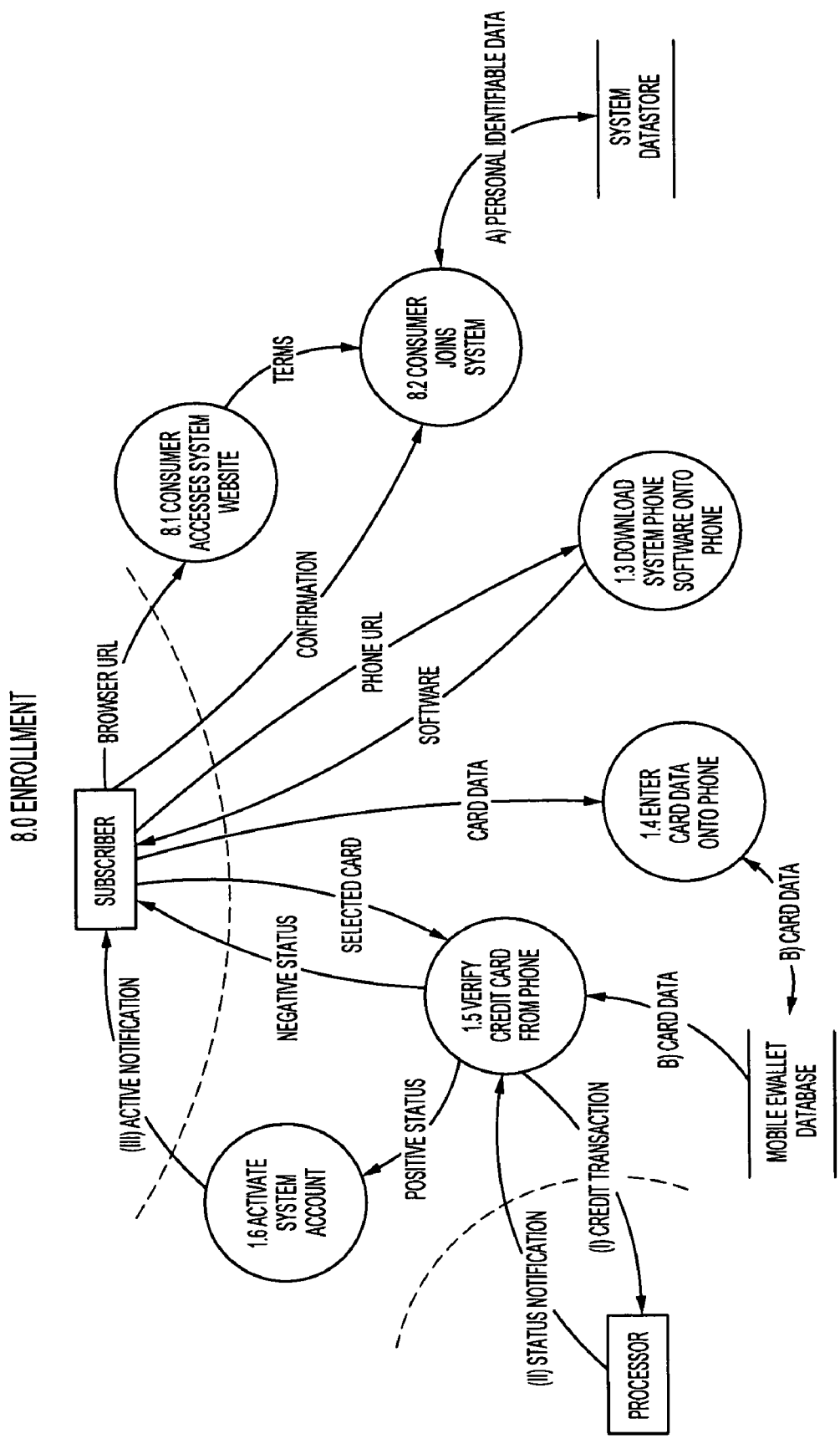
FIG. 8 is a process diagram showing the process of customer subscriber enrollment in the System.

To use the System, a user must become a subscriber by establishing a System account and have at least one or more mobile internet enabled communication devices. FIG. 8 generally shows the enrollment process. To establish an account, the user will access the System platform 4 from the System web based portal. Generally, access is via desktop or laptop, not the mobile device due to the amount of information to be exchanged. In the future, with HTTP enabled mobile devices, direct access by the mobile device may become feasible.

A new user will access the Web portal and request a new account. Through an interchange with the user, certain information needed to establish an account is initially exchanged, for instance: subscriber name, subscriber's system "name" and password, shipping address, billing address, mobile device identification (e.g. phone numbers or static IP addresses), and assignment of the active (or default) mobile device in the event the user desires to register more than one mobile devices, and other pertinent information. The System platform software may use other resources to verify the user supplied information, and after verification, establishes an account for the new Subscriber and will assign a System identifier to the newly established subscriber. If the subscriber's account information is to be stored on the System database, the subscriber will enter the account information, establish an account identifier (the alias, the viewable account description displayed on the mobile device visual screen), and enter other relevant information for storage on the System. The System platform may also build a configuration file with the Subscriber's preferences, configurations and other options to be downloaded later to the subscriber's mobile device 1A.

For information be stored on the mobile device 1A, a means must be undertaken to transfer data to the mobile database. One method is to build the mobile database or configuration file on the System, and download the files from the System platform 4 to the mobile device 1A. File transfer protocol (FTP) could be utilized to download both the mobile system application program and the System platform constructed database/configuration files. Alternatively, the Subscriber can download a desktop/laptop application software package through the System portal for building and populating a database that will be later installed on the subscriber's mobile device 1A and/or for possible uploading and storage on the System databases. The laptop/desktop software can be shipped to the user if desired.

When building the database on the subscriber's desktop or laptop, the Subscriber runs the downloaded software on the desktop/laptop to construct the mobile database or configuration files. The downloaded may include a partially filled database structure with information stored on the System database provided by the Subscriber during enrollment, such as subscriber name, address, System supplied subscriber account number, and other information. Additionally, the desktop/laptop software is designed to encrypt designated data entered (when final data is stored on the mobile database) so that the designated data is only stored in encrypted form and can only be decrypted by the System platform.

In either event, (System platform or desktop/laptop built database) the subscriber will enter (or for an established subscriber, modify) user information, actual account information and account alias (e.g. how the account will be referenced or named on the mobile device, such as VISA ****4195) the account access rules (such as PIN assignment, or biometric information needed to access account information, e.g. voice sample, or other biometric measure used as a security feature); personal preference or personal account information (for instance, airline mileage accounts, hotel preferred user identifications, etc).

Information is stored in three general areas of the database: financial account information, Subscriber personal information; and Subscriber preferences. The Subscriber can also enable CTC transactions and enter information for CTC transactions. When the database is stored on the System, the mobile device also contains a database, but that database contains very limited information as the mobile device in this embodiment is used primarily a non-intelligent input device. For instance, account aliases would be stored, but not actual account information. The data storage on such a non-intelligent device can be further reduced by pushing input selections (such as aliases) from the System platform to the mobile device during each transaction.

Once the database is built and configurations established, they are saved on the laptop/desktop or System platform. The saved database (or a portion of it) and mobile application software must be transferred to the mobile communications device(s). Several alternatives can be used to transfer data and vary depending on where the data is initially located. First, the mobile system application program must be installed on the mobile device. This can be accomplished by interfacing the mobile device with the desktop, or to the System platform and downloading directly to the mobile's Internet features. Alternatively, the mobile could be interfaced with a storage device (such as a USB flash memory) having the software stored thereon transferred and installed on the mobile device. One embodiment can allow transfer (possibly including the mobile system application program) from the desktop/laptop to the mobile device, through an interface program designed to communicate with the mobile AMS, using a mobile docking station or USB interface (if the mobile device is so equipped). For instance, some mobile communications devices, such as the Blackberries, already have software for syncing data files though a USB connection.

Another option is to download to the mobile device through the System Server through an established system mobile application program. For instance, to update an existing mobile database, the System mobile application is already installed. It is also possible to input information into the mobile device directly through preloaded software, but this is not preferred due to limitations on mobile device keyboards and processing limitations.

Once the mobile device is configured, it is desirable to exercise the account information to ensure accuracy of the information. For instance, the System platform can request that the subscriber pay a charge through each of the listed accounts using the System to assist in the transaction (the merchant in this event would be the System itself) in order to fully activate the account.

Figure 9:
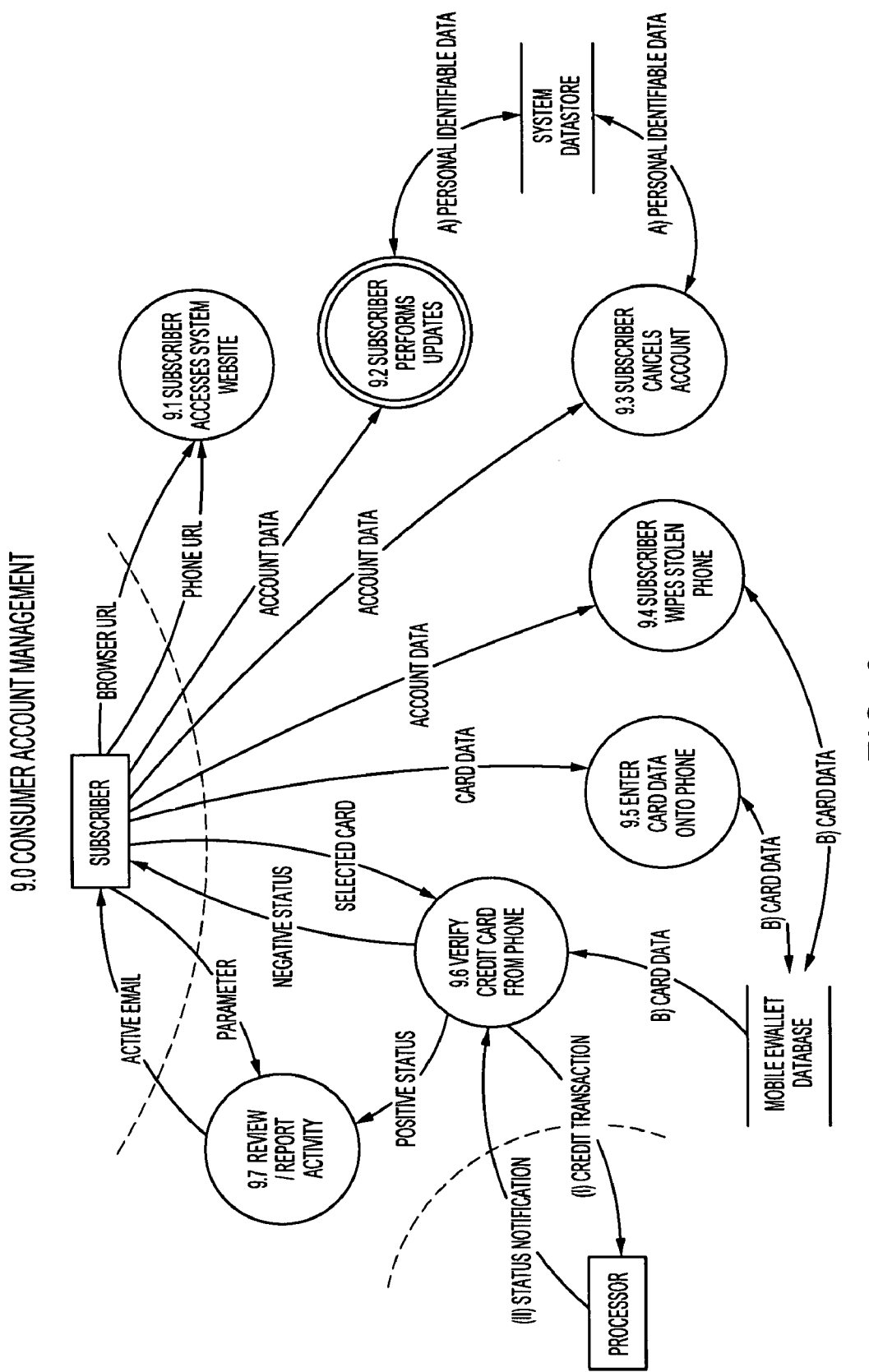
FIG. 9 is a process diagram showing the process of subscriber management of its subscriber account.

An active account can be reconfigured, edited or modified using similar procedures, such as displayed in FIG. 9 As shown in FIG. 9 (see 9.4) the System can provide an option to "wipe" or erase the stored mobile databases. This feature is activated by the Subscriber through the Server web based portal and can be used to erase data on the mobile device in the event the device is lost or stolen. The subscriber will log into the subscriber's account and request the data wipe.

As described, the Subscriber's sensitive account information can be stored in the System or the mobile device databases (and possibly, a backup desktop database). Further, it is preferred that the certain sensitive data stored in the mobile database (if any) be stored encrypted. The Subscriber personal information may be stored in the mobile and encrypted using a different key or algorithm that of the encrypted sensitive account information. Even if the mobile device is stolen or the desktop hacked, the account information remains secure unless the encryption scheme can be broken.

In the current embodiment, the System platform 4 has the ability to decrypt the information stored on the mobile device, as the System platform 4 provides the encryption scheme. In future embodiments, the ability of the System platform 4 to decrypt account information can be eliminated by having the issuing bank platform 3 (e.g. the bank or credit card company) load account information on the System platform database, mobile device database or desktop built database using the issuing bank's encryption scheme, thereby providing additional security measures. For instance, the Subscriber could access the issuing bank through the issuing banks web portal and request the issuing bank to download encrypted account information into the database under construction or the mobile device. Alternatively, encrypted information could be passed from the issuing bank to the System platform database 4 for storage of download to the mobile device database. This embodiment is generally only applicable if the mobile device stores the actual account information. When the subscriber account database is stored on the System, encryption is not usually needed as the System database will be protected by firewalls and other security devices, although encryption on the System database could be used for security redundancy.

B. Merchant Account

Figure 4:
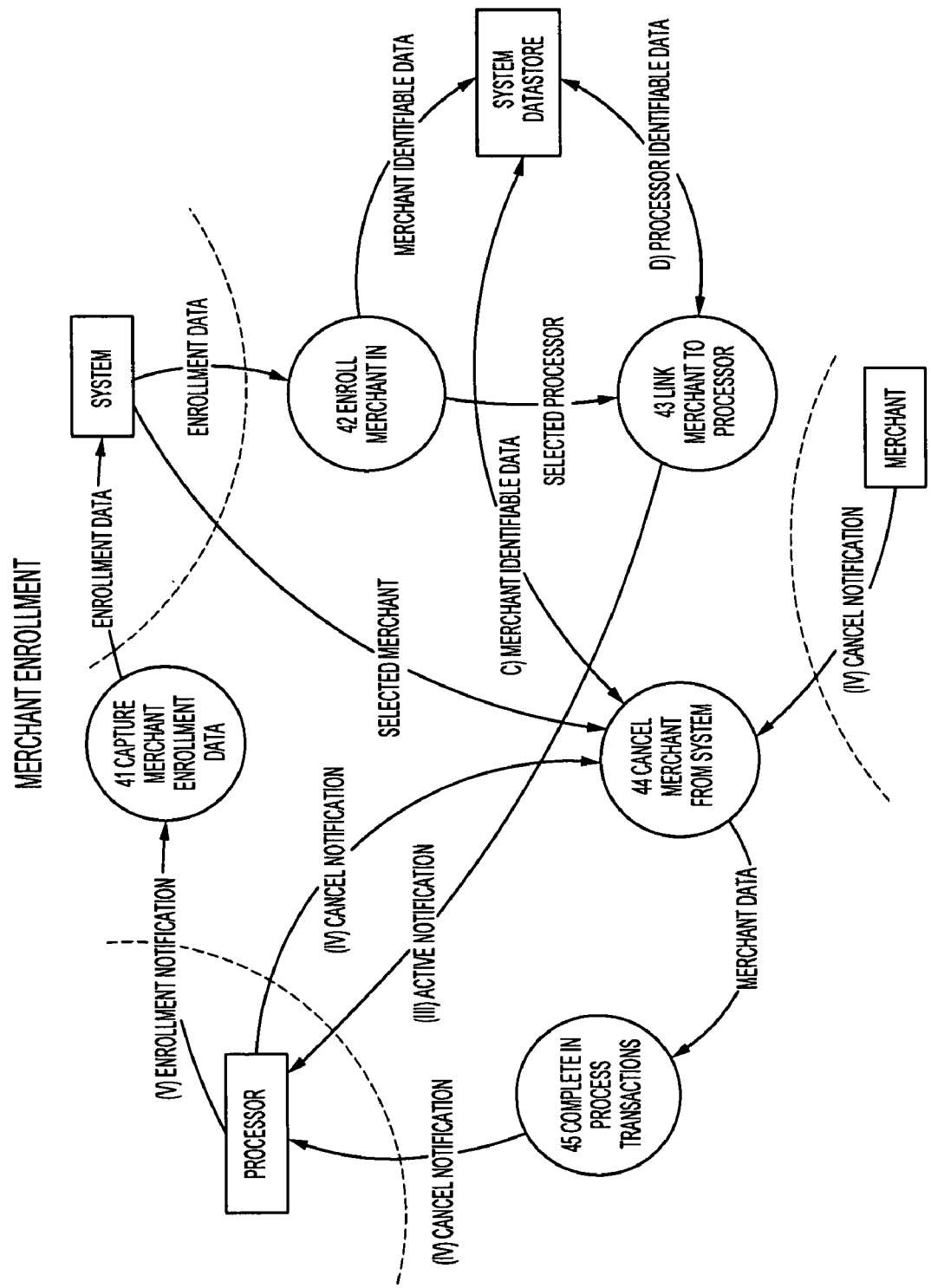
FIG. 4 is a process diagram showing the process of merchant enrollment.
Figure 4A:
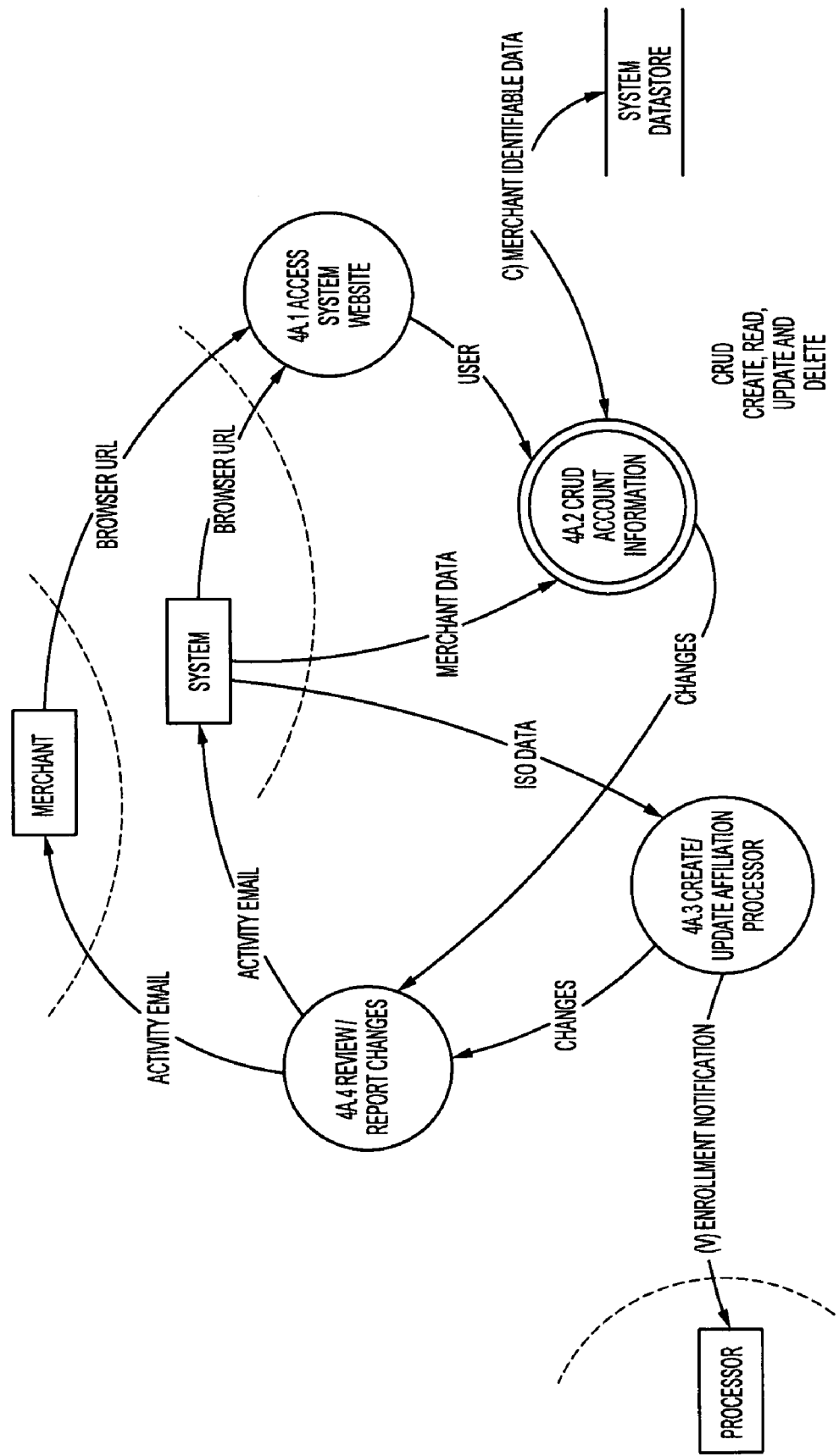
FIG. 4A is a process diagram showing the process of merchant management of its merchant subscriber account.

Finally, for each merchant using the system, the merchant will enroll as a merchant subscriber with the System, and have data associated with the merchant (merchant data). See generally FIG. 4. The merchant platform will be configured to interface the System (such as receive the merchant software module designed or be informed of transfer request formats for web services). The enrolled Merchant will be given a merchant subscriber ID and associated with the System Processor if the System will process the account information (see generally 4.3) (e.g. credit card information) for this merchant or the merchant subscriber account data will indicate that a Merchant Processor will be the processing party. Details of the Merchant Processor may be included in the System database, if needed. The merchant will configure the merchant's system data, particularly, merchant data that interfaces with subscriber's PI or preference data. For instance, the merchant data can interface certain subscriber PI or preference data to determine pricing options, availability options, service upgrades, etc for a particular transaction. For example, the merchant may be a travel agent and recognize American Airlines miles discounts, Hilton bonus points or other third party vendor programs. If the particular subscriber's preferences indicate such an account, this information can be used to help assist the transaction. By allowing the merchant data space to interface with the subscriber personal information space, details of a particular transaction can be established quickly and efficiently. Obviously, the merchant will have the ability to manage, edit or modify the merchant's account data, such as shown in FIG. 4A. The merchant has the capability to access the system (possibly for a fee) and receive reports, billing information, statistical analysis, etc.

C. Processor Accounts

Figure 5:
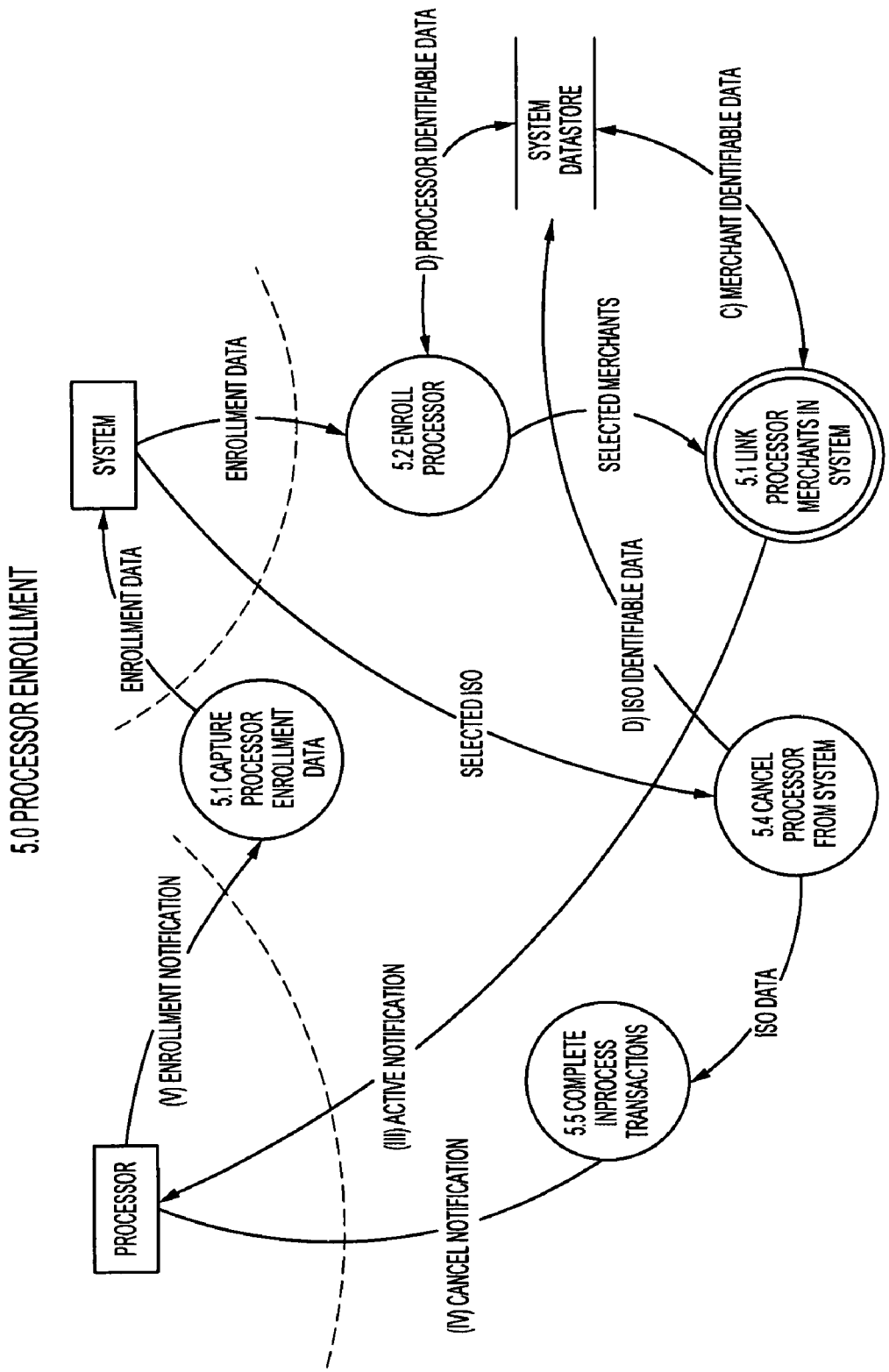
FIG. 5 is a process diagram showing the process of Processor enrollment.
Figure 6:
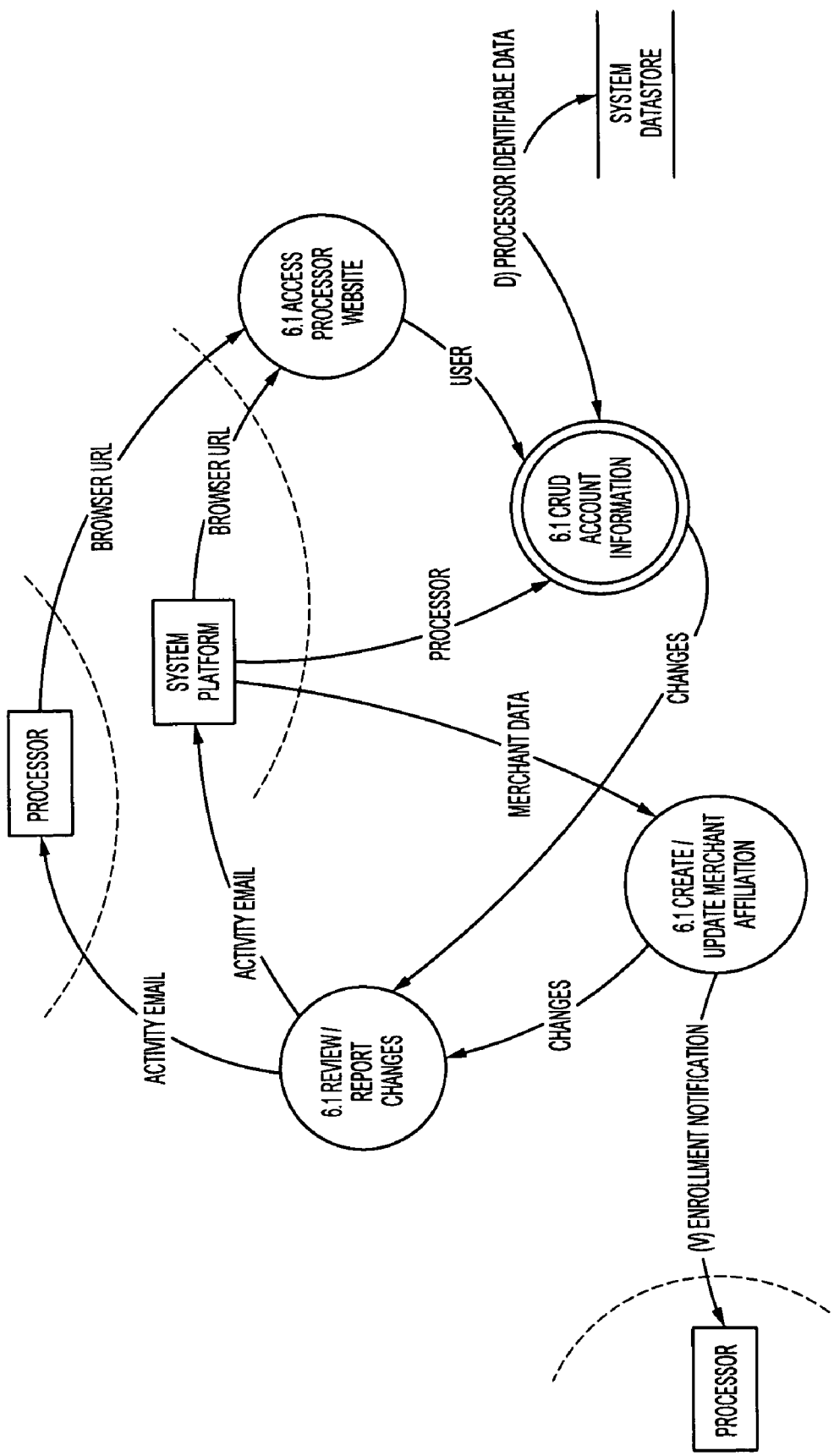
FIG. 6 is a process diagram showing the process of merchant management of its merchant subscriber account.

For System Processors, the System includes the software to enroll Processors as a System Processors or Processor subscriber and to manage the Processor's system data account such as shown in FIGS. 5 and 6 (manage Processor account). System Processors must be enrolled as Processor subscribers and linked to those merchants for which the Processor will act as clearing/notification agent to the issuing banks for approval. In this instance, the System Processor should have information on the acquiring bank (the merchant bank, the ultimate repository of payment funds) to be able properly handle payment requests.

The invention claimed is:

1. A system for facilitating credit card type transactions, said system including a system platform and a subscriber mobile device, said system platform acting as an intermediary between a merchant platform, a processor and said subscriber mobile device during a credit card type transaction, said subscriber mobile device having a means for a third party to initiate electronic communications to the mobile device, each merchant platform communicating electronically with said system platform during a transaction, said subscriber mobile device communicating electronically with said system platform during a credit card type transaction, where the merchant platform receives transaction information from a subscriber, said system platform receiving a portion of the transaction information electronically from the merchant platform, said system platform electronically communicating a portion of said received transaction information to said subscriber mobile device, said mobile device receiving a subscriber's selected credit card type account identifier and sending data related to said subscriber chosen credit card type account identifier to said system platform, said system platform electronically transmitting credit card type account information related to said transmitted credit card type account identifier to a processor for payment authorization, wherein said credit card type account information related to said transmitted credit card type account identifier is an encrypted credit card type account identifier where the encryption comprises storing a first portion of said credit card account type account identifier on said system platform and storing a second portion of said credit card account type account identifier on said mobile device.

2. The system in claim 1 wherein said system platform transmits the credit card type account information to a system processor.

3. The system in claim 1 wherein said system platform transmits the credit card type account information to a merchant processor.

4. The system in claim 1 further including a subscriber database containing subscriber account information.

5. The system of claim 4 wherein said subscriber database is located on said system platform.

6. The system of claim 4 where said subscriber database is located on the subscriber mobile device.

7. The system of claim 1 wherein said subscriber supplied data is received by the merchant platform electronically from the subscriber mobile device.

8. The system of claim 1 wherein said subscriber supplied data is received by the merchant platform though voice communications.

9. The system of claim 8 wherein said subscriber supplied data is received by the merchant platform though voice communications through said subscriber mobile device.

10. The system of claim 1 wherein said merchant platform is another subscriber platform and said credit card type transactions is a request to fund an account of said another subscriber.

11. The system of claim 1 wherein said credit card type transaction is another subscriber platform and said credit card type transactions is a request to fund an account of said another subscriber.

12. The system of claim 1 wherein said credit card type transaction is a purchase by a subscriber at a point of sale.

13. The system of claim 1 wherein said credit card type transaction is a purchase of good or services through a call center.

14. The system of claim 1 wherein said credit card type transaction comprises a credit card transaction, a debit card transaction, a checking account transaction, a customer's financial institution account transaction, or a vendor's customer account transaction.

* * * * *